United States Patent
Brauer

[19]

[11] Patent Number: 5,992,066
[45] Date of Patent: Nov. 30, 1999

[54] APPARATUS WITH LAMINATED DIFFUSER FOR ILLUMINATING MEDICAL DIAGNOSTIC IMAGING FILM

[76] Inventor: William R. Brauer, 2420 N. Pasadena Blvd., Wauwatosa, Wis. 53226

[21] Appl. No.: 08/757,265

[22] Filed: Apr. 21, 1997

[51] Int. Cl.⁶ .................................................. G02B 27/02
[52] U.S. Cl. ................................ 40/361; 40/564; 362/97; 362/331; 359/641
[58] Field of Search .......................... 40/361, 362, 366, 40/367, 564, 577; 362/97, 330, 331; 359/641

[56] References Cited

U.S. PATENT DOCUMENTS

| | | | |
|---|---|---|---|
| 3,492,486 | 1/1970 | Bischoff et al. ............... | 40/361 X |
| 3,597,868 | 8/1971 | Tamborello ................... | 40/361 |
| 4,298,916 | 11/1981 | Shemitz ....................... | 362/330 X |
| 4,542,449 | 9/1985 | Whitehead .................... | 362/330 |
| 4,602,448 | 7/1986 | Grove .......................... | 362/97 X |
| 5,414,599 | 5/1995 | Kaneko et al. ................ | 362/330 X |
| 5,797,668 | 8/1998 | Kojima et al. ................ | 362/330 X |
| 5,836,096 | 11/1998 | Brauer .......................... | 40/361 |

*Primary Examiner*—Brian K. Green
*Attorney, Agent, or Firm*—Skarsten Law Offices S.C.

[57] ABSTRACT

Apparatus for illuminating medical diagnostic imaging film comprises a light source for projecting light toward the imaging film, and a plurality of light diffusion film layers positioned in close adjacent relationship with one another, between the imaging film and the light source. Each of the diffusion film layers has a specified index of refraction, and the diffusion layers collectively act to scatter the projected light. An optical adhesive having an index of refraction which is substantially equal to the diffusion film index of refraction is positioned between respective adjacent surfaces thereof to substantially eliminate air-filled spaces therebetween, and to bond the film diffusion layers together into a unitary light diffusion structure. A plurality of layers of microprism film are positioned between the light diffusion film and the imaging film for redirecting at least a portion of the scattered light into a beam of collimated light directed to illuminate the imaging film.

21 Claims, 3 Drawing Sheets

APPARATUS WITH LAMINATED DIFFUSER FOR ILLUMINATING MEDICAL DIAGNOSTIC IMAGING FILM

BACKGROUND OF THE INVENTION

The invention disclosed and claimed herein generally pertains to improved apparatus for illuminating film, containing a radiographic or other medical diagnostic image, for viewing and study. More particularly, the invention pertains to apparatus of such type which includes an improved light diffuser comprising layers or laminations of film material for increasing the amount of light transmitted therethrough.

View boxes are well-known types of devices used by radiologists to view and study radiographic images and other medical diagnostic images which are on film. Such images, showing selected views of body tissue, can be obtained by means of conventional X-ray, computed tomography (CT), magnetic resonance imaging (MRI), and other techniques known to those of skill in the medical diagnostic imaging arts. By carefully studying such images, a radiologist can detect the presence of significant medical conditions in a patient or other subject, without the need for invasive surgery. Some important examples of such conditions include breast cancer, lung cancer, pneumonia, fracture, and arthritis.

A conventional view box generally is used to view medical diagnostic film which typically is on the order of 14 inches by 17 inches. Such a device contains one or more fluorescent tubes or other sources of light, and has a front panel typically comprising a translucent light diffuser, such as a sheet of milky white Plexiglas. Also, the dimensions of the front panel may be large enough to accommodate four films, placed side by side, at the same time. Each radiographic imaging film is placed on the light diffuser and transilluminated, for viewing and study, by light from the light source. The light passes through the diffuser and is diffused or scattered thereby. Thus, the light transmitted to the imaging film is of uniform brightness or intensity, so that the imaging film is uniformly illuminated. If a view box was not provided with a diffuser or other means for scattering light from the fluorescent tube light source, the fluorescent tubes would tend to be seen through the imaging film, interfering with the study thereof.

Radiographic films record an image as a pattern of silver crystals. Light from the view box can be either blocked or scattered by these crystals. This process produces a complimentary pattern in the light leaving the observer's side of the film. Some of this light travels to the observer's eye, and the pattern of light is focused onto his or her retina. In an ideal view box, the observed pattern of light would precisely correspond to the pattern of silver crystals in the film, accurately transmitting the film image to the observer.

The view box currently used in practice is not an ideal view box because it produces diffuse or scattered light, as stated above. Scattered light can randomly travel from one part of the film to another. More specifically, a scattered light ray may travel obliquely from a bright part of the imaging film into an adjacent dark part of the film, and then be scattered in the dark part of the film to the observer's eye. If this occurs, then the observer will perceive the scattered light ray as having come from the dark part of the film. The observer will then perceive the dark part of the film as being brighter than it actually is, which will decrease contrast between the bright and dark areas of the film. Most of this scatter occurs close to the border between the bright and dark areas of the film, thereby blurring the border and causing decreased resolution of the observed image. This can be thought of as a sort of leakage of light from the bright part of the film into the dark part of the film. Thus, the radiologist's task of correctly interpreting a film image is made more difficult. Certain conditions, such as breast cancer, lung nodules, and small pneumothorax (collapsed lung) are especially hard to detect in any event. If there is too much blurring of edges, or insufficient contrast between brighter and darker areas of a film image, a correct diagnosis of such conditions may not even be possible. The term "resolution," as used herein, means the level of sharpness which characterizes the boundary, or edge, between adjacent lighter and darker regions of an image.

In the past, it has been suggested that contrast of a medical diagnostic imaging film, illuminated by means of a view box, could be improved by substantially increasing the spatial separation between the light source and the imaging film. Thus, the light illuminating the film would become less diffuse. However, the proposed spatial separation was on the order of six to twelve feet, whereas the depth of a conventional view box is generally less than one foot. It would be highly impractical for a number of reasons, including cost and spatial constraints, to construct a view box having the proposed expanded dimensions.

U.S. patent application Ser. No. 08/610,218, filed Mar. 4, 1996 by William R. Brauer, the inventor herein, teaches the use of light directing film to collimate the scattered light projected toward radiographic imaging film, i.e., to substantially reduce the solid angle thereof. By illuminating the imaging film with collimated light rather than diffuse light, it has been found that contrast and resolution have been very significantly improved, when viewing the film. It was also found that collimation of scattered or diffuse light was particularly effective if multiple layers of the light directing film were employed. However, use of multiple light directing film layers tended to reduce the total amount of light passing therethrough to illuminate the imaging film. In order to ensure that sufficient light reached the imaging film, it was found necessary to increase the amount of light initially provided by the light source.

Moreover, as stated above, the flat front panel of a conventional view box may be made large enough to simultaneously accommodate four 14 inch by 17 inch diagnostic films placed in side-by-side relationship. This arrangement allows the radiologist to readily compare information provided by different films, such as films showing the same view of a patient at different times. Because of light diffusion in a conventional view box, the radiologist's field of view extends to the entire panel. Thus, he can view all four films at the same time, with comparatively little head or body movement. However, if collimated light is employed to illuminate imaging film on a view box panel, only light transmitted through a comparatively small region of the panel, and the film thereon, will be received by the radiologist's eye, while his eye is fixed at a specified position. Thus, use of collimated light can substantially diminish field of view. In a conventional view box, and particularly a view box for displaying multiple films, significant reduction in field of view could force a viewer to continually move his upper body, in order to view all the films on the front panel in their entirety. This, in turn, may cause fatigue and muscle stiffness, particularly if viewing of diagnostic film continues over a prolonged period of time.

SUMMARY OF THE INVENTION

Apparatus for illuminating medical diagnostic imaging film is provided, which includes a light source projecting light toward the imaging film, and a plurality of light diffusion film layers positioned in close adjacent relationship with one another between the imaging film and the light source. Each of the diffusion film layers has a specified index of refraction, and the diffusion film layers collectively act together to scatter the projected light. An optical adhesive having an index of refraction which is substantially equal to the specified index of the diffusion film layers is positioned between respective adjacent surfaces thereof to substantially eliminate air-filled spaces therebetween, and to bond the diffusion film layers together into a unitary light diffusion structure. Collimating means are positioned between the light diffusion structure and the imaging film for redirecting at least a portion of the scattered light into a beam of collimated light which is directed onto and through the imaging film.

In a preferred embodiment, the collimating means comprises one or more layers of collimating film. Respective diffusion film, and collimating film layers are joined together in stacked or laminated relationship, by means of the optical adhesive, to form a laminated light processing package. Preferably, collimating film layers comprise sheets of microprism film, each having microscopic prism elements formed therein.

In another embodiment, the collimating and diffusion film layers may be selectively curved to maintain field of view while improving contest and resolution.

OBJECTS OF THE INVENTION

An object of the invention is to provide a light diffuser for a view box comprising a plurality of sheets or layers of a light diffusion film.

Another object is to provide an arrangement of the above type, wherein adjacent layers of the light diffusion film are joined together with a clear optical adhesive having a refractive index which is substantially the same as the diffusion film refractive index.

Another object is to provide an arrangement of the above type, wherein the layers of diffusion film, together with the optical adhesive, form a diffusion structure or device which is substantially more transmissive to light than a conventional view box light diffuser.

Another object is to provide an arrangement of the above type for use with collimating film, wherein the improved light transmissivity of the diffusion structure offsets the tendency of collimating film to reduce passage of light, so that the brightness of illuminating light reaching the imaging film is maintained Another object is to provide a view box with improved contrast and resolution, while substantially maintaining the field of view thereof.

These and other objects of the invention will become more readily apparent from the ensuing specification, taken together with the accompanying drawings.

DETAILED DESCRIPTION OF THE PREFERRED EMBODIMENT

Figure 1:
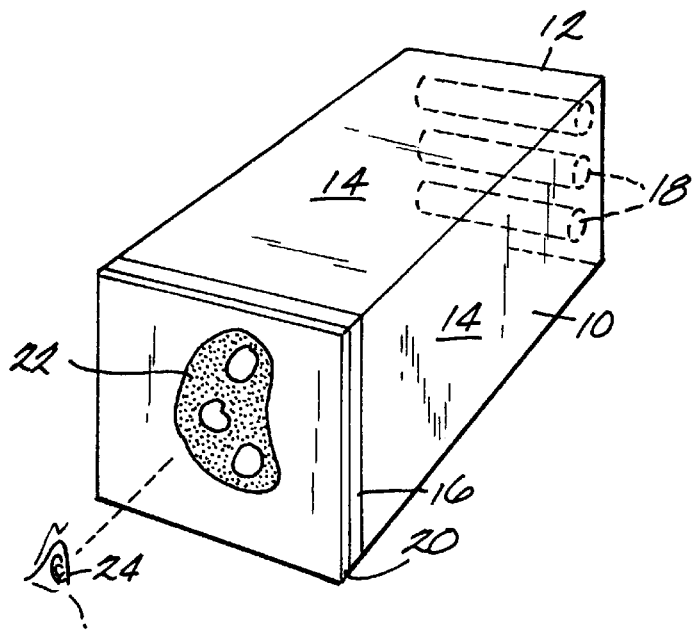
FIG. 1 is a perspective view showing a prior art view box.

Referring to FIG. 1 there is shown a conventional view box 10, generally comprising a rear wall 12, side walls 14, and a diffuser panel 16, which collectively enclose a space. Fluorescent tubes 18 are mounted on the inner surface of rear wall 12, to serve as a light source for the view box 10. Diffuser panel 16 comprises a sheet of translucent, milky white Plexiglas, and, as described above, is provided so that light from the source can pass through the diffuser panel and be diffused or scattered thereby. An X-ray or radiographic film 20 is fastened upon diffuser panel 16 by clips or other suitable means (not shown) so that light transmitted through diffuser 16 illuminates an X-ray image 22 imprinted on the film 20. The light carries an image of the X-ray film image 22 to the retina 24 of an observer's eye.

Figure 2:
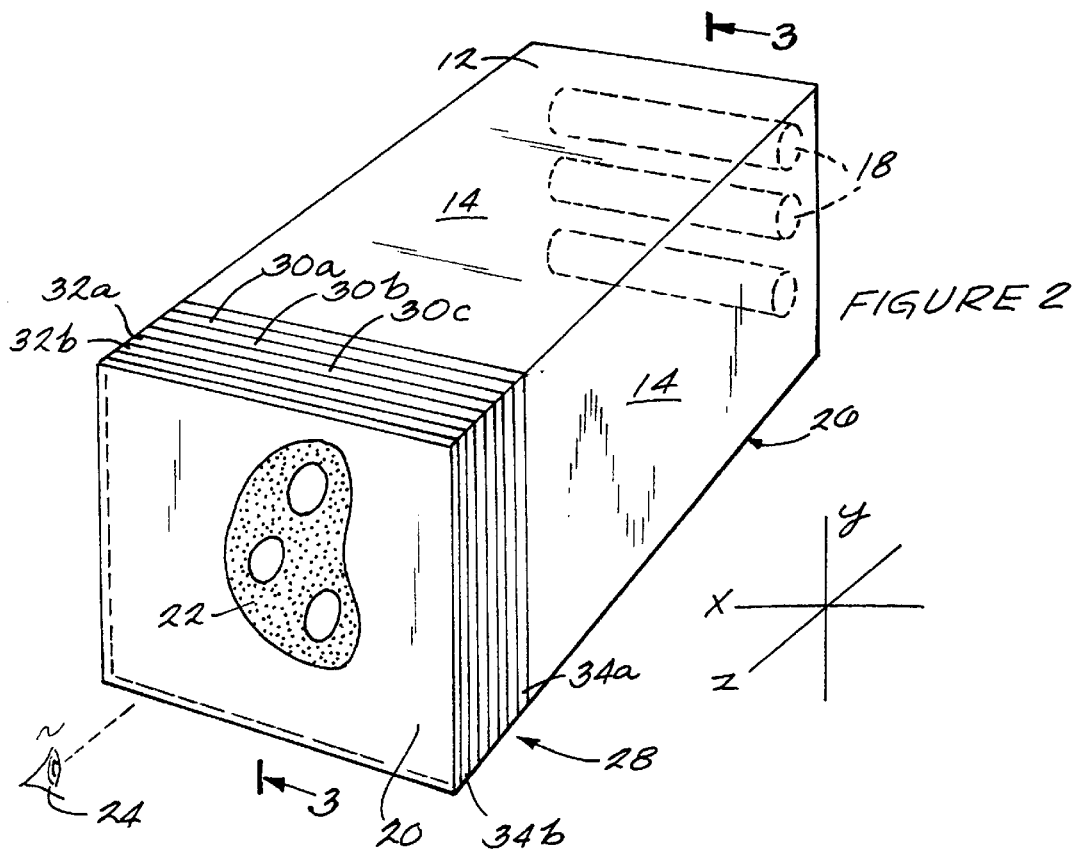
FIG. 2 is a perspective view showing a view box provided with an embodiment of the invention.

Referring to FIG. 2, there is shown a view box 26, comprising a portion of view box 10 shown in FIG. 1, including side walls 14, rear walls 12, and fluorescent tubes 18. However, the diffuser 16 has been replaced with a laminated light package 28, constructed in accordance with the invention. Package 28 generally comprises three sheets or layers of a diffusion film 30a–c, two sheets or layers of a collimating film 32a and 32b, and two sheets of thin, transparent plastic material 34a and 34b. Respective film layers and plastic sheets are described hereinafter in further detail, and are positioned together in close, adjacent stacked relationship. FIG. 2 further shows film 20, with image 22 thereon, positioned in abutting relationship with plastic sheet 34b, which comprises one end of light processing package 28. Plastic sheet 34a, comprising the opposing end of package 28, is oriented toward light source 18 to receive light therefrom.

Figure 3:
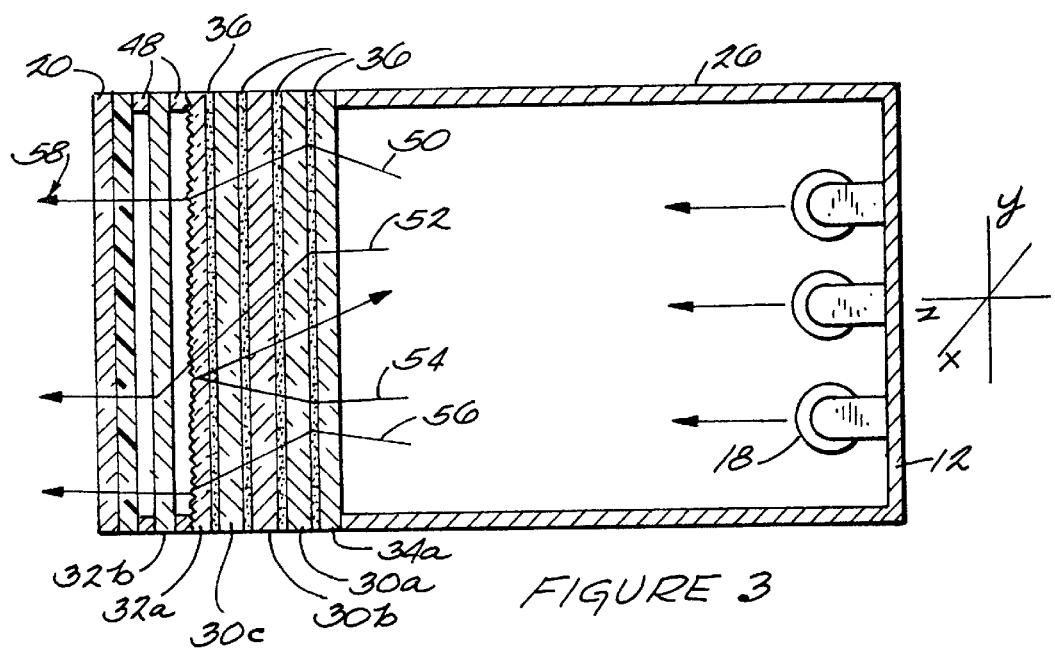
FIG. 3 is a sectional view taken along lines 3—3 of FIG. 2.

Referring to FIGS. 2 and 3 in combination, there is shown diffusion film layers 30a–c firmly bonded to one another, as well as to collimating film layer 32a and plastic sheet 34a, by means of a clear optical transfer adhesive 36, positioned between respective adjacent surfaces thereof. Certain characteristics of optical adhesive 36 are critical to the invention, and arm described hereinafter. Each diffusion film layer has a thickness on the order of 20 mils, and usefully comprises a sheet of diffusion film manufactured by the Minnesota Mining and Manufacturing Company, and referred to thereby as DFA 20. Each such film sheet diffuses or scatters light, as is necessary for proper operation of the view box as stated above. However, each diffusion film sheet also allows much more light to be transmitted therethrough than a prior art diffuser, such as diffuser 16 shown in FIG. 1. In accordance with the invention, a plurality of diffusion film sheets 30a-are stacked together to provide a cumulative thickness on the order of 60 mils. It has been found that diffusion film of such type having a cumulative thickness in the range 40 mils–60 mils, scatters light sufficiently to meet the aforesaid diffusion requirements for useful view box operation.

It is to be emphasized that if the diffusion layers 30a–c were merely placed together, even if held tightly together, there would still be air-spaces therebetween. The index of refraction of diffusion film of the above type is approximately 1.5, whereas the refractive index of air is approximately 1.0. As a result, a great deal of light reflection would occur at each air-diffusion film interface. This would substantially reduce the amount of light passing through the diffusion film layers to illuminate imaging film 20. Accordingly, the layers of optical transfer adhesive 36 are placed between the diffusion film layers 30a–c, as described above, and also between the diffuser and the adjacent flat surface of collimating film 32a. Optical adhesive 36 is highly transparent, and is selected to have an index of refraction on the order of 1.3–1.5, so that the index thereof substantially matches the refractive index of diffusion film 30a–c. Moreover, the optical adhesive 36 is carefully positioned with respect to the diffusion film layers, as well as with respect to collimating film layers 32a and plastic sheet 34a, as shown in FIGS. 2 and 3, so that air bubbles and other air spaces are eliminated therebetween. Thus, the diffusion film layers 30a–c, together with optical adhesive 36, form a unitary light diffusion structure which transmits much more light than the conventional light diffuser 16. More particularly, the light diffusion structure shown in FIGS. 2 and 3 has been found to transmit approximately 90% of received light, whereas a prior art diffuser such as diffuser 16 transmits only 50% of received light. Thus, the light diffusion structure formed by diffusion film layers 30a–c and optical adhesive 36 significantly increases the brightness of light available to illuminate imaging film 20. The optical adhesive 36 usefully comprises a product manufactured by the Minnesota Mining and Manufacturing Company, which is referred to thereby as Optically Clear Transfer Adhesive.

Figure 4:
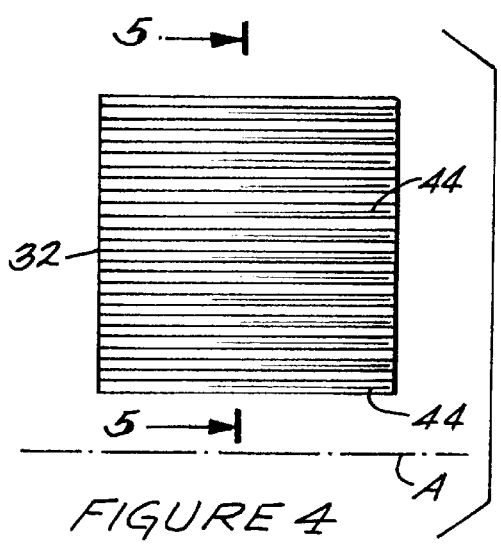
FIG. 4 shows a film material, comprising parallel rows of microprisms, which is usefully employed in the embodiment of FIG. 2.
Figure 5:
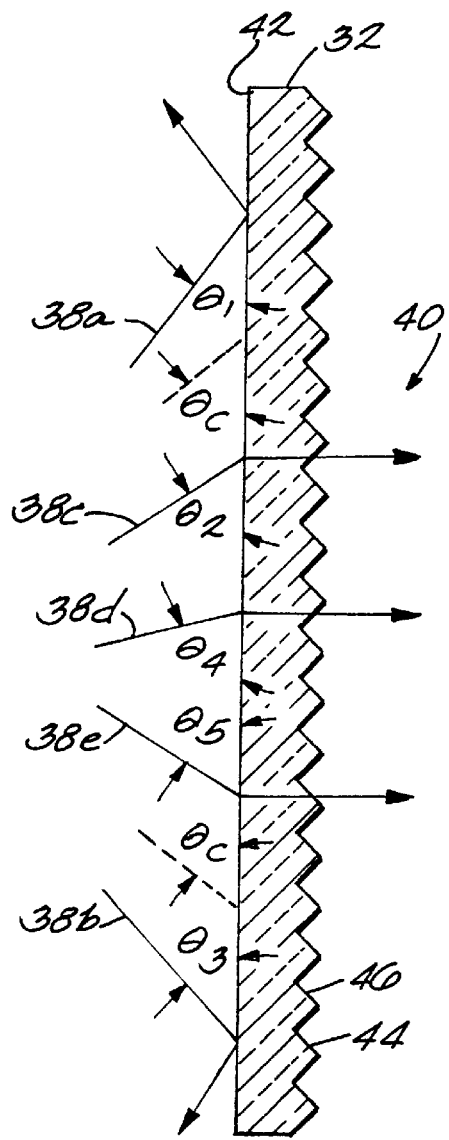
FIG. 5 is a sectional view taken along lines 5—5 of FIG. 4.

Referring to FIGS. 4 and 5 in combination, there is shown a sheet of film 32, which may usefully be employed for the collimating film layers 32a and 32b. Film 32 comprises a film material capable of selectively directing incident light rays which lie in planes orthogonal to the plane of the film 32, i.e., the plane of FIG. 4. More specifically, when such light rays are incident on the film 32, from the left side thereof as viewed in FIG. 5, and at angles of incidence which are less than a critical angle $\theta_c$ relative to the film plane, the light rays will be reflected back by the film and will therefore not be transmitted therethrough. However, other of such light rays, which are incident on the film 32 at angles of incidence which are greater than $\theta_c$, will be transmitted therethrough. Moreover, the transmitted light rays will be refracted by film 32 onto paths lying at much smaller angles, relative to an axis orthogonal to the plane of film 32, than the angles of their respective paths prior to refraction. Thus, FIG. 5 shows incident light rays 38a and 38b reflected back from the film 32, since their respective angles of incidence $\theta_1$ and $\theta_3$ are less than the critical angle $\theta_c$. On the other hand light rays 38a, 38d, and 38e are each refracted by film 32 as described above, since their respective angles $\theta_2$, $\theta_4$, $\theta_5$ are all greater than $\theta_c$. Accordingly, they are redirected or converged to lie within a substantially smaller solid angle, that is, they are converged into a collimated light beam 40. (It will be appreciated that as the solid angle approaches zero degrees, the beam 40 approaches a perfectly collimated light beam, i.e., a beam comprising parallel light rays.) For purposes of this application, "collimated light" refers to rays of light included in a solid angle which is less than 90°, such as an angle between 45° and 90°. As stated above, illuminating film 20 with collimated light, i.e., light limited to an angle within such range, has been found to significantly improve contrast and resolution in viewing the image 22.

Referring further to FIGS. 4 and 5, there is shown film sheet 32 having a smooth side 42 and an opposing side having a large number of parallel microscopic ridges 44 formed therein. Each ridge 44 extends across the face of sheet 32 and has a triangular cross section 46 of microscopic size. Thus, each ridge 44 comprises a microprism. The microprism film 32 has a thickness on the order of 0.1 mm, and a spacing on the order of 0.1 mm between the peaks of adjacent ridges 44. A hypothetical reference axis A shown in FIG. 4 indicates the orientation of respective parallel ridges 44. It has been found that microprism film 32, very usefully comprises a product manufactured by the Minnesota Mining and Manufacturing Company and referred to thereby as Brightness Enhancement Film, or BEF-II.

The ridges or microprisms 44 of film 32 are very effective in directing light rays as described above which lie in, or have large components lying in, planes orthogonal to the direction of the ridges. However, components of diffused light lying in other planes will tend to pass through the film 32 without change in direction. Accordingly, the two layers of film 32a and 32b shown in FIGS. 2 and 3 have been found to be more effective than a single sheet thereof in reducing scatter in the light received from the diffusion film, and for collimating such light into a beam for illuminating X-ray film 20. Preferably, the two film layers 32a and 32b have their microprism ridges 44 respectively oriented in parallel relation with X- and Y-coordinate axes shown in FIGS. 2 and 3, i.e., in orthogonal relationship with each other. The smooth sides 42 of collimating film layers 32a and 32b face toward the light source 18 and diffusion film 30a–c, and the ridges 44 thereof are directed toward the X-ray film 20.

Referring again to FIG. 3, there is shown collimating film layer 32a joined to collimating film layer 32b by means of an adhesive material 48, which could comprise, for example, an amount of optical adhesive 36, other suitable adhesive, or a tape with adhesive on both sides. It is essential to position adhesive material 48 so that is contacts collimating film layer 32a only around the outer edges or periphery thereof, on the side or surface thereof, on which the ridges 44 and microprisms 46 are formed. Otherwise, the adhesive 48 could enter the spaces between respective ridges, and seriously interfere with the collimating action of film 32a. Thus, FIG. 3 shows an air space between respective ridges 44 of collimating layer 32a and side 42 of collimating layer 32b.

Similarly, adhesive material 48 is positioned around the outer edges or periphery of collimating film layer 32b and plastic sheet 34b.

Referring further to FIG. 3, there are shown representative light rays 50–56, all scattered by diffusion film layers 30a–c. Rays 50 and 56 are refracted by collimating film layer 32a, and ray 52 is refracted by film layer 32b, as described above to provide a collimated light beam 58. Beam 58 is substantially orthogonal to the plane of film 20, and is projected therethrough to illuminate image 22. Ray 54 is reflected back into the interior of view box 26, and therefore does not contribute to the illumination of film 20. As stated above, the substantial increase in light transmissivity through diffusion film layers 30a–c effectively offsets or compensates for the loss of light resulting from collimating film reflection Accordingly, the use of collimating film layers 32a and 32b does not diminish the amount of light from source 18 which ultimately is available to illuminate the imaging film.

Plastic sheets 34a and 34b comprise clear plastic, such as polycarbonate, having a thickness on the order of 0.03 inches. The outer surfaces thereof, i.e. the right side of sheet 34a and the left side of sheet 34b, as viewed in FIG. 3, may be coated with a material to resist scratching, such as a product known as MARNOT, sold by the Tekra Corporation. Plastic sheets 32a and 34b are sufficiently stiff to support the diffusion and collimating film layers in substantially parallel relationship with one another, and with imaging film 20 when the imaging film is placed in abutting relationship with sheet 34b of package 28. Imaging film 20 can be removably held against sheet 34b by means of clips or the like (not shown.) While also not shown, plastic sheet 34 a of package 28 can be joined to the ends of side walls 14 by means of screws, adhesive, or clips. It may be desirable to place a frame (not shown) around the edges of the respective components of light processing package 28 to provide a finished appearance, and also to mount clips for attaching imaging film 20 thereto.

Figure 6:
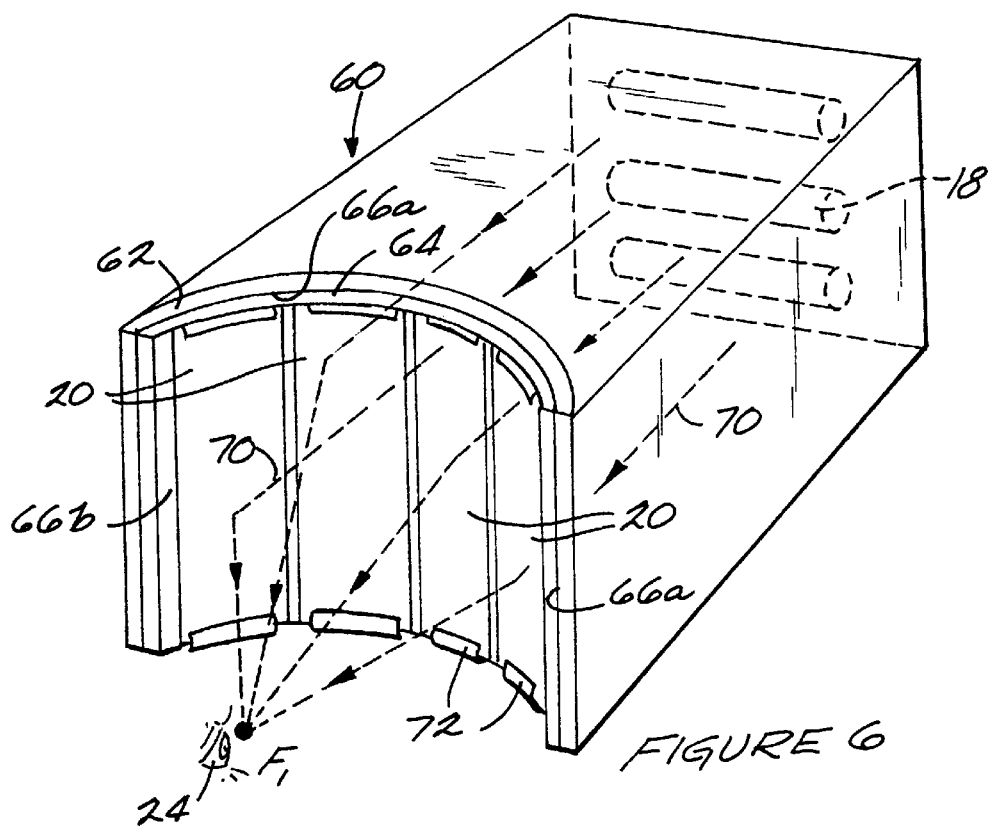
FIG. 6 shows a modification of the invention for maintaining field of view.

Referring to FIG. 6, there is shown a view box 60, wherein the end thereof opposite light source 18 has been configured to receive a curved frame 62. A light processing package 64, which is similar or identical to light processing package 28 described above and comprises the same components, is fitted around frame 62 to form a curved structure. Preferably, the curved package 64 lies along a section of a circle having a radius of three feet. The convex surface of the curved package is provided by a plastic sheet 66a, corresponding to sheet 34a of light processing package 28. The concave surface of the curved package 64 is provided by a plastic sheet 66b, corresponding to sheet 34b thereof. Thus, light rays 68 projected by source 18 will be scattered by diffusion film within package 64, as described above, and will then be collimated to provide a beam of collimated light 70, by collimating film within package 64 as likewise described above.

Referring further to FIG. 6, there are shown four films 20 mounted on sheet 66b, such as by means of clips 72 which follow the curvature of light processing package 64. Because of the curvature, collimated light beam 70 is projected through the films 20, and is then focused to a focal point $F_1$. Thus, the light passing through each portion of the films 20 carries an image thereof to the focal point $F_1$. Accordingly, if a viewer places the retina 24 of his eye at $F_1$, his field of view will include substantially all portions of all films 20 positioned along curved package 64. At the same time, the collimated light will provide improved resolution and contrast for the viewed images as described above. Thus, field of view is preserved.

Figure 7:
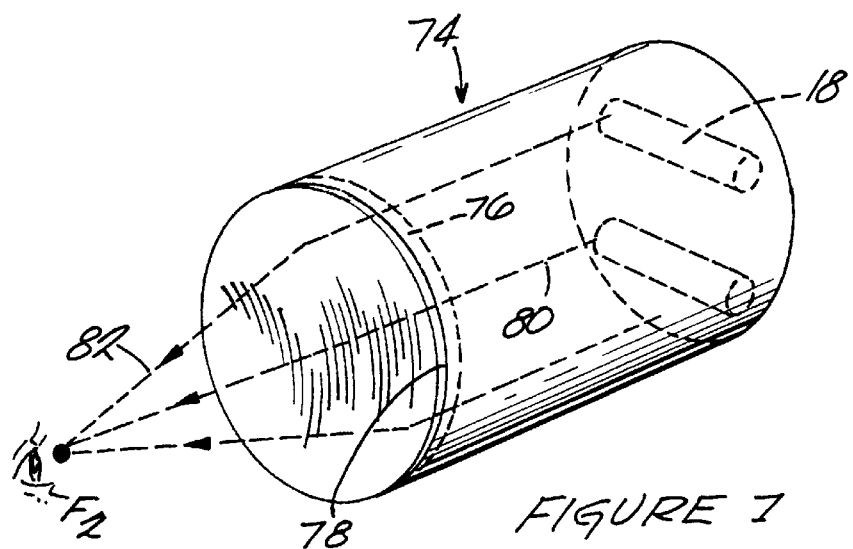
FIG. 7 is a perspective view showing a further modification for maintaining field of view.

In an alternative embodiment shown in FIG. 7, view box 74 has an end 76 opposite from light source 18, which is shaped to lie on a curve comprising a section of a hypothetical sphere. A light processing package 78, which is similar or identical to light processing package 28, is positioned to follow the contour of the curved view box end 76. Thus, light 80 from the source 18 in view box 74 will be diffused and collimated by components within package 78 to produce a collimated light beam 82, which is focused to a focal point $F_2$.

Obviously, many other modifications and variations of the present invention are possible in light of the above teachings. It is therefore to be understood that within the scope of the disclosed concept, the invention may be practiced otherwise than as specifically described.

What is claimed is:

1. Illuminating apparatus comprising:

medical diagnostic imaging film;

a light source for projecting light toward said imaging film;

a plurality of light diffusion film layers positioned in close adjacent relationship with one another between said imaging film and said light source, each of said diffusion film layers having a specified index of refraction, and said diffusion film layers collectively acting to scatter said projected light;

an optical transfer adhesive having an index of refraction which is substantially equal to said specified index of refraction positioned between respective adjacent surfaces of said diffusion film layers to substantially eliminate air-filled spaces therebetween, and to bond said diffusion film layers together into a unitary light diffusion structure; and collimating means positioned between said light diffusion structure and said imaging film for redirecting at least a portion of said scattered light into a beam of collimated light directed toward said imaging film.

2. The apparatus of claim 1 wherein:

said collimating means comprises a layer of a collimating film in close adjacent relationship with a specified one of said diffusion film layers; and a layer of said optical adhesive is positioned between said layer of collimating film and said specified diffusion film layer.

3. The apparatus of claim 1 wherein:

said collimating means comprises a plurality of layers of collimating film in close adjacent relationship with one another; and a specified adhesive means is positioned around respective outer edges of said layers of collimating film to join said layers of collimating film to one another.

4. The apparatus of claim 3 wherein:

each of said layers of collimating film comprises a layer of microprism film, each having microscopic prism elements formed therein.

5. The apparatus of claim 4 wherein:

each of said layers of microprism film comprises a number of parallel rows of microscopic prism elements, the rows of microscopic prism elements of one of said layers of microprism film being oriented in non-parallel relationship with the rows of microscopic prism elements of another one of said layers of microprism film.

6. The apparatus of claim 5 wherein:

said apparatus comprises first and second layers of said microprism film, rows of said first and second layers of said microprism film being oriented in orthogonal relationship with each other.

7. The apparatus of claim 6 wherein:

said layers of microprism film and said diffusion film layers collectively form a laminated light processing package having first and second end surfaces in opposing relationship, said first end surface comprising a surface of one of said layers of microprism film, and said second end surface comprising a surface of one of said light diffusion film layers; and said apparatus further includes first and second transparent protective layers selectively bonded to said first and second end surfaces, respectively.

8. The apparatus of claim 7 wherein:

said light processing package is selectively curved to focus said beam of collimated light to a specified focal point after passing through said imaging film.

9. The apparatus of claim 8 wherein:

said light processing package is curved to lie along a section of a circle of selected radius.

10. Illuminating apparatus comprising:

medical diagnostic imaging film;

a light source for projecting light toward said imaging film;

a light diffusion structure positioned with respect to said light source for scattering said projected light;

collimating film positioned to redirect at least a portion of said scattered light into a beam of collimated light directed to pass through said imaging film; and a frame disposed to support said imaging film and said collimating film, and to selectively curve said collimating film so that said curved collimating film focuses said collimated light to a specified focal point.

11. The apparatus of claim 10 wherein said diffusion structure comprises:

a plurality of light diffusion film layers positioned in close adjacent relationship with one another, each of said diffusion film layers having a specified index of refraction, and collectively acting to scatter said projected light; and an optical transfer adhesive having an index of refraction which is substantially equal to said specified index of refraction positioned between respective adjacent surfaces of said diffusion film layers to substantially eliminate air-filled spaces therebetween, and to bond said film diffusion layers together.

12. The apparatus of claim 10 wherein:

said collimating film comprises at least one layer of microprism film having microscopic prism elements formed therein.

13. The apparatus of claim 10 wherein:

said imaging film and said collimating film are curved by said frame to lie on a section of a hypothetical circle.

14. The apparatus of claim 10 wherein:

said collimating film comprises a plurality of layers of microprism film, each having microscopic prism elements formed therein.

15. The apparatus of claim 10 wherein:

said frame is disposed to hold said imaging film in close abutting relationship with said collimating film.

16. Apparatus for illuminating medical diagnostic imaging film comprising:

a light source for projecting light in a specified direction;

means selectively positioned with respect to said light source for scattering said projected light;

collimating film disposed to receive at least a portion of said scattered light, and to redirect said received portion into a beam of collimated light; and a frame disposed to support said imaging film with respect to said collimating film so that said collimated light passes through said imaging film, said frame being further disposed to selectively curve said collimating film so that said curved collimating film focuses said collimated light to a specified focal point.

17. The apparatus of claim 16 wherein:

said collimating film comprises at least one layer of microprism film having microscopic prism elements formed therein.

18. The apparatus of claim 16 wherein:

said collimating film comprises a plurality of layers of microprism film, each having microscopic prism elements formed therein.

19. The apparatus of claim 16 wherein:

said imaging film and said collimating film are curved by said frame to lie on a section of a hypothetical circle.

20. The apparatus of claim 16 wherein:

said light scattering means comprises at least one layer of light diffusion film.

21. The apparatus of claim 21 wherein said light scattering means comprises:

a plurality of light diffusion film layers positioned in close adjacent relationship with one another, each of said diffusion film layers having a specified index of refraction; and an optical transfer adhesive having an index of refraction which is substantially equal to said specified index of refraction positioned between respective adjacent surfaces of said diffusion film layers to substantially eliminate air-filled spaces therebetween, and to bond said diffusion film layers together into a unitary light diffusion structure.

* * * * *